United States Patent
Galvano et al.

(10) Patent No.: US 9,584,022 B1
(45) Date of Patent: Feb. 28, 2017

(54) SYSTEM AND METHOD FOR A SWITCHED-MODE POWER SUPPLY

(71) Applicant: Infineon Technologies AG, Neubiberg, DE (US)

(72) Inventors: Maurizio Galvano, Padova (IT); Roberto Penzo, Chioggia (IT); Paolo Milanesi, Padova (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/062,746

(22) Filed: Mar. 7, 2016

(51) Int. Cl.
   *H05B 33/08* (2006.01)
   *H02M 3/158* (2006.01)

(52) U.S. Cl.
   CPC ........ *H02M 3/158* (2013.01); *H05B 33/0815* (2013.01)

(58) Field of Classification Search
   CPC ....... H02M 3/158; H05B 37/02; H05B 33/08; H05B 33/0815
   USPC ..... 315/209 R, 210, 224–226, 291, 307, 308
   See application file for complete search history.

(56) References Cited

U.S. PATENT DOCUMENTS

| | | | |
|---|---|---|---|
| 4,897,591 A | 1/1990 | Spani | |
| 2010/0026203 A1* | 2/2010 | Zhao | H05B 33/0815 315/291 |
| 2012/0274290 A1 | 11/2012 | Ye et al. | |
| 2013/0322122 A1 | 12/2013 | Sigamani et al. | |
| 2015/0256071 A1 | 9/2015 | Penzo et al. | |

OTHER PUBLICATIONS

Texas Instruments, Inc, "TPS92661EVM-001 LED Matrix Manager Evaluation Module (EVM) Users Guide," SLVUA51A—Sep. 2014, 33 pgs.

\* cited by examiner

*Primary Examiner* — Jimmy Vu
(74) *Attorney, Agent, or Firm* — Slater Matsil, LLP (57) ABSTRACT

In accordance with an embodiment, a method includes receiving an indication of a changed load condition or voltage characteristic of a power supply providing power to a load via an output port of the power supply in a first mode, and switching regulation of the power supply from sourcing a current to the load in the first mode to sinking the current from the load in a second mode in response to receiving the indication of the changed load condition or voltage characteristic. Sinking the current from the load in the second mode includes controlling the power supply to transfer energy from the output port of the power supply to an input port of the power supply.

27 Claims, 6 Drawing Sheets

SYSTEM AND METHOD FOR A SWITCHED-MODE POWER SUPPLY

TECHNICAL FIELD

The present invention relates generally to power devices, and in particular embodiments, to a system and method for a switched-mode power supply.

BACKGROUND

Direct Current (DC) to DC (DC-to-DC) converters, may be used as drivers for loads with specific current and/or voltage requirements, such as chains of light-emitting diodes (LEDs). The light intensity of an LED chain is controlled by the amount of current flowing through it, and consequently, traditional LED drivers generally rely on a current control loop to regulate the current flowing through the LED chain. Those regulators are relatively effective at regulating power when the load is static, but may struggle to maintain a constant current when the load is abruptly changed, such as when one or more LEDs are dynamically bypassed/shorted. More specifically, dynamically shorting LEDs in the LED chain instantaneously reduces the forward voltage biasing of the LED chain, which causes the output capacitor coupled in parallel to the LED chain to discharge. Discharging of the output capacitor produces a current spike through the LED chain that has the potential to damage the remaining LEDs. The current spike may be difficult for the current control loop to regulate, as the current spike occurs relatively quickly and is driven primarily by the output capacitors, rather than the regulated power supply.

SUMMARY

In accordance with an embodiment, a method includes receiving an indication of a changed load condition or voltage characteristic of a power supply providing power to a load via an output port of the power supply in a first mode, and switching regulation of the power supply from sourcing a current to the load in the first mode to sinking the current from the load in a second mode in response to receiving the indication of the changed load condition or voltage characteristic. Sinking the current from the load in the second mode includes controlling the power supply to transfer energy from the output port of the power supply to an input port of the power supply.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. While much of this disclosure is described in the context of LED drivers, it should be appreciated that the concepts provided herein are applicable to other supply circuits.

In an embodiment, a LED power supply transfers power from an input node to one or more LEDs. During normal operation, the power supply regulates the current flowing to the LEDs using a current regulation loop. However, prior to changing the number of LED being supplied, the output capacitor is discharged to a voltage that corresponds to the combined forward voltages of the LEDs. In some embodiments, this may be done by switching the regulation of the power supply from a current control loop to a voltage control loop just before the load condition is changed. Thus, the voltage control loop reduces the voltage of the power driver to a target voltage, after which the load condition can be changed without triggering a discharge of the output capacitor.

In some embodiments, the energy stored in the output capacitors is recovered by transferring energy from capacitors coupled to the output of the power supply back to the input of the power supply. In some cases this energy may be transferred to an input capacitor and/or a battery coupled to the input of the LED power supply. This transfer of energy may be accomplished, for example, using a recovery circuit, such as a second power converter circuit, coupled in parallel with the LED power supply, or via the LED power supply itself operating in a reverse operation mode. These and other aspects are described in greater detail below.

Figure 1:
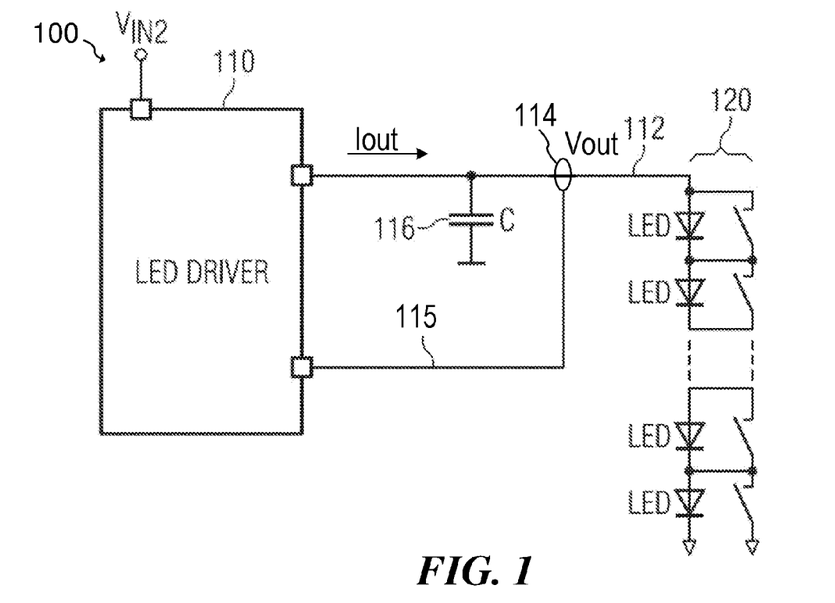
FIG. 1 illustrates a diagram of a conventional LED driver architecture.

FIG. 1 illustrates an LED driver architecture 100 that includes a conventional LED driver 110 adapted to power an LED chain 120. As shown, the conventional LED driver 110 includes an output 112 coupled to the LED chain 120. Current measurement circuit 114 measures the current provided to LED chain 120 and provides current feedback signal 115, which is used by LED driver 110 to regulate a current provided to LED chain 120. The light intensity of the LED chain 112 is primarily dependent on the current flowing through LED chain 112. Accordingly, the conventional LED driver 110 uses current feedback signal 115 to maintain the current level over the output 112 to regulate the brightness of the LEDs.

The number of LEDs in the LED chain 120 may be dynamically changed during operation of the conventional LED driver 110. For example, one or more of the LEDs in the LED chain 120 may be dynamically bypassed to shorten the LED chain 120, thereby instantaneously reducing the forward voltage bias across the LED chain 120. This causes the output capacitor 116 to at least partially discharge and create a current spike through the LED chain 120. The current spike is difficult to curtail from the perspective of the current control loop of LED driver 110, as the current spike occurs relatively quickly and is driven primarily by the discharge of the output capacitor 116, rather than the power supplied by the conventional LED driver 110.

Figure 2:
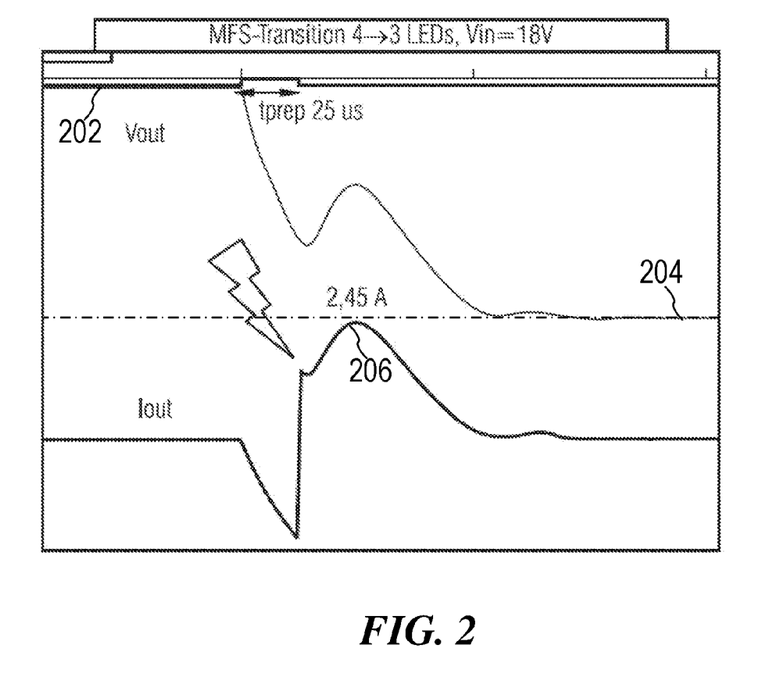
FIG. 2 illustrates a graph of a current spike over the output of a conventional LED driver experiencing a dynamic load reduction.

FIG. 2 illustrates a graph of a current spike 206 that occurs over the output 112 of the conventional LED driver 110 when the LED chain 120 is shortened from four LEDs to three LEDs. As can be seen in FIG. 2, output voltage Vout of LED driver 110 transitions from a starting voltage 202 to a final voltage 204. Starting voltage 202 is equivalent to about four LED forward voltages and final voltage 206 is equivalent to about three LED forward voltages. The current spike 206 in output current Tout occurs during the transition from starting voltage 202 to final voltage 204 due to the discharge of capacitor 116. Similar issues may be present in other types of power supplies driving dynamically switchable loads.

Embodiments of the present invention mitigate current spikes when dynamically shortening a chain of series-connected circuit elements by using a voltage control loop to regulate the output of the power supply just prior to the dynamic load event. For example, the voltage control loop may smoothly transition the output voltage of the power supply from a first voltage that corresponds to the sum of the forward voltages of the currently connected LEDs 120 to a second voltage that corresponds to the sum of forward voltages of the LEDs after the chain is shortened. During this voltage transition, energy stored in capacitor 116 transferred to the input of the power conversion system, thereby recovering energy.

Figure 3A:
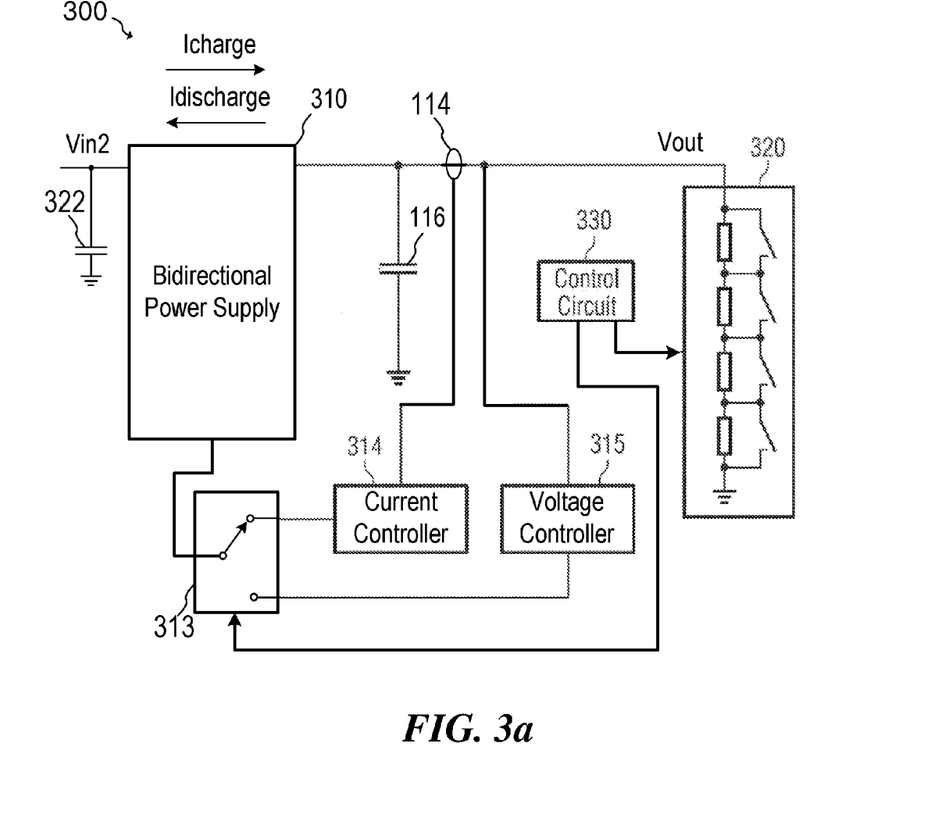
FIGS. 3a and 3b illustrate a diagrams of power supply architectures according to various embodiments.

FIG. 3a illustrates an embodiment power supply system 300 that includes a bidirectional power supply 310 adapted to drive a chain of series-connected circuit elements 320. The chain of series-connected circuit elements 320 may include any type of circuit elements (e.g., diodes, resistors, capacitors, etc.) coupled in series, and may be adapted to be dynamically shortened and/or lengthened during a dynamic load event. In some embodiments, series-connected circuit elements 320 may include selectable series-connected LEDs. In alternative embodiments, series-connected circuit elements 320 may be replaced by a switchable load that includes non-series-connected elements.

The control circuit 330 may determine when a load condition associated with the chain of series-connected circuit elements 320 is going to be dynamically changed, and then transition operation of the power supply 310 from a first mode in which current controller 314 is used to regulate output current Icharge to a second mode in which voltage controller 315 is used to regulate output voltage Vout. As shown, current controller 314 receives a feedback signal from current measurement circuit 114 that measures the output current of bidirectional power supply 310, and voltage controller receives a signal by monitoring the output voltage Vout of bidirectional power supply 310. The output voltage Vout may be monitored directly by voltage controller 315 directly or via a feedback circuit that includes, for example, a voltage divider, an opto-coupler, or other suitable feedback circuitry. In some embodiments, voltage controller 315 may use indirect methods to determine output voltage Vout.

The change in operation between current control and voltage control is represented by selection switch 313 that may be switched just prior to a change in a load condition. However, it should be understood that any suitable circuit or system could be used to transition operation between using current controller 314 and voltage controller 315.

In various embodiments, current controller 314, bidirectional power supply 310 and their associated feedback paths form a current control loop and voltage controller 315, bidirectional power supply 310 and their associated feedback paths form a voltage control loop. Current controller 314 and voltage controller 315 may be implemented power supply control circuits known in the art and may be constructed using analog and/or digital circuitry. In some embodiments, current controller 314 and voltage controller 315 may be implemented using a microcontroller or other processor. In one embodiment, current controller 314 and voltage controller 315 may implement a proportional-integral-differential (PID) controller or control algorithm. Alternatively, other controller algorithms may be used. It should be further understood that while current controller 314 and voltage controller 315 are illustrated as separate blocks, current controller 314 and voltage controller 315 may share circuitry in some implementations.

During the second mode, the voltage controller 315 may regulate output voltage Vout from an initial voltage to a target voltage. The target voltage may be determined in accordance with the future load condition associated with the chain of series-connected circuit elements 320. For example, the target voltage may be lower than the initial voltage when the load condition is being reduced. Conversely, the target voltage may be higher than the initial voltage when the load condition is being increased. Other conditions may also govern setting of the target voltage. Once the output of the power supply 310 is within a threshold of the target voltage, the chain of series-connected circuit elements 320 can be dynamically lengthened/shortened and/or the load can be changed. Thereafter, the control circuit 330 may change operation of power supply system 300 from voltage control back to current control. Control circuit 330 may also control the reconfiguration of series-connected circuit elements 320. In various embodiments, the control of the various series-connected circuit elements 320, the determination of initial and target voltage, the determination of when the various modes are activated, as well as possible circuit implementations of mode and power control circuit may be implemented as described in co-pending U.S. patent application Ser. No. 14/575,125 filed on Dec. 18, 2014, which application is incorporated herein by reference in its entirety.

In various embodiments, when the target voltage is less than the initial voltage, output capacitor 116 is discharged when the voltage control loop is active. In order to reduce energy loss due to the discharging of capacitor 116, bidirectional power supply is operated in a reverse direction. That is, energy is transferred from the output of bidirectional power supply 310 at node Vout to the input of bidirectional power supply at node Vin2. This transferred energy may be stored, for example, in capacitor 322 coupled to power supply node Vin2. Alternatively, energy may be transferred from capacitor 116 to a battery or other energy storage device.

Figure 3B:
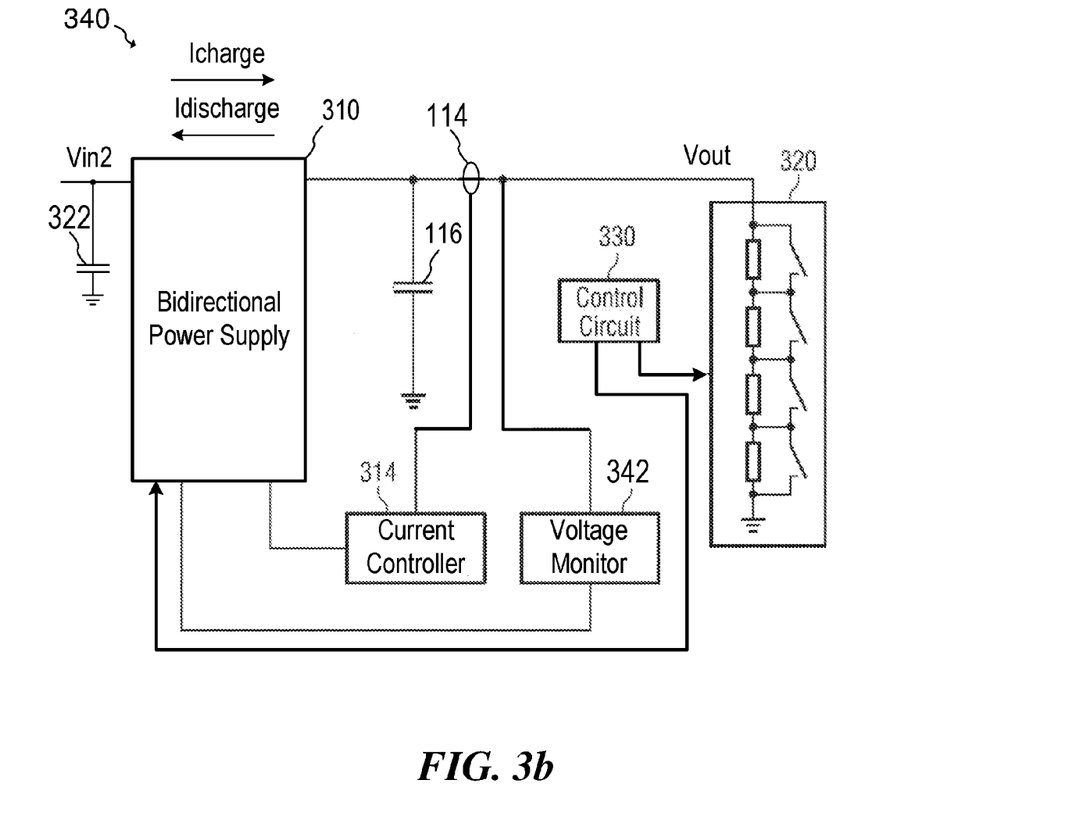

FIG. 3b illustrates power supply system 340 according to an alternative embodiment that uses a controlled reverse current to discharge capacitor 116 to the new target voltage prior to a change in the number of element in series-connected circuit elements 320. During operation, current controller 314 controls the current Icharge to series-connected circuit elements 320. Prior to a change in the number of series-connected circuit elements, current controller controls reverse current Idischarge in order to discharge capacitor 116 and reduce output voltage Vout. In various embodiments, this reverse current may be a constant or programmable current. During the time that bidirectional power supply 310 produces reverse current 310, voltage monitor 342 monitors output voltage Vout and notifies bidirectional power supply 310 when the target voltage is reached. Once the target voltage is reached, bidirectional power supply 310 resumes supplying constant forward current Icharge to series-connected circuit elements 320.

In various embodiments, voltage monitor 342 may be implemented using voltage monitoring circuits and method known in the art. For example, in some embodiments, voltage monitor 342 may be implemented using a comparator coupled to a reference voltage, an A/D converter, or other suitable circuits such as amplifiers to monitor output voltage Vout.

Figure 4:
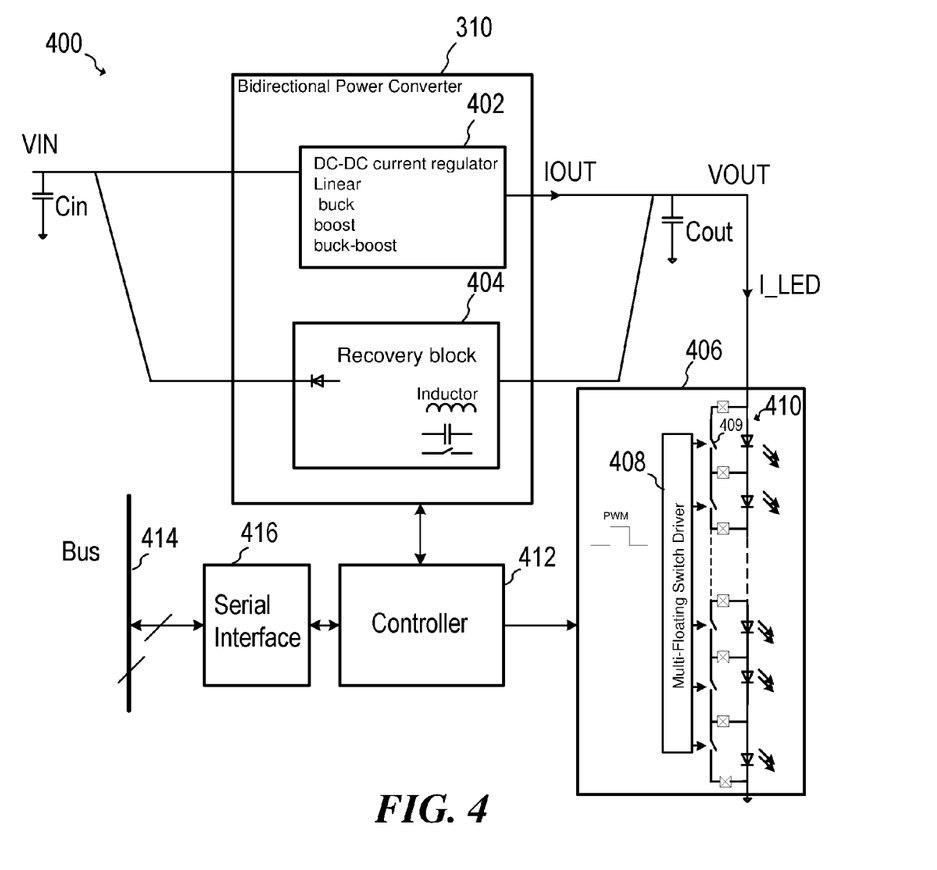
FIG. 4 illustrates a diagram of an embodiment LED driver architecture.

The above described techniques can be used to regulate various power supply architectures configured to drive various load configurations including, for example, an LED driver adapted to drive a chain of LEDs. For example, FIG. 4 illustrates an embodiment LED lighting system 400 that includes bidirectional power converter 310 coupled to selectable LED load circuit 406.

In an embodiment, bidirectional power converter 310 includes a power converter 402 that is configured to transfer energy from node Vin to node Vout and recovery circuit 404 coupled in parallel with power converter 402 that is configured to transfer energy in the reverse direction from node Vout to node Vin. During operation, power converter 402 configured to transfer power in the forward direction operates when bidirectional power converter 310 provides a controlled current in the current control mode, and recovery circuit 404 operates when bidirectional power converter 310 provides a controlled voltage in the voltage control mode. Power converter 402 may be implemented using various power converter and topologies. For example, power converter 402 may be implemented using linear current regulator or a switched-mode power supply topology including, but not limited to a buck converter, a boost converter or a buck-boost converter.

Recovery circuit 404, which is responsible for transferring energy from output capacitor Cout to the input of bidirectional power converter 310, may be implemented using a switched mode power converter, such as a single-ended primary inductor converter (SEPIC), a buck-boost converter or other converter type. During operation, the parallel path of recovery block may be used to discharge output capacitor Cout until a new safe target output voltage is reached. Once the target value is reached, recovery circuit 404 may be shut down when bidirectional power converter 310 is reactivated. Energy recovered from output capacitor Cout may be stored in input capacitor Cin, a battery (not shown), or another type of energy storage device coupled to input node Vin. In some embodiments, the functions of power converter 402 and recovery circuit 404 may be merged together in a single power converter that can operate in a bidirectional manner such as an H-bridge or a buck-boost converter.

In various embodiments, capacitor Cout has a capacitance of between about 10 µF and about 100 µF. Alternatively, capacitances outside of this range may be used depending on the particular embodiment and its specifications.

LED load circuit 406 includes a plurality of series-connected LEDs 410 that can be shorted by a corresponding plurality of switches 409 driven by multi-floating switch driver 408. In some embodiments, the switch setting is static for each LED setting such that the amount of regulated current produced by bidirectional power converter 310 determines the light intensity produced by LEDs 410. In other embodiments, the brightness of LEDs 410 may be further adjusted by applying a PWM signal to switches 409 in place of or in addition to controlling the light intensity via the regulated current. Multi-floating switch driver 408 may be implemented using floating switch driver circuit and systems known in the art. For example, switch driver 408 may be a stand-alone device that is separate from controller 412. In such an embodiment, switch driver 408 may communicate with controller 412 via a digital bus such as an SPI bus and/or may communicate with controller 412 via bus 414. In other embodiments, switch driver and/or switches 409 may be disposed on a same semiconductor substrate as controller 412 and/or may be disposed on the same semiconductor substrate that provides the current control, voltage control and/or voltage monitoring functions of embodiment power supply systems.

In various embodiments, controller controls the switch configuration of LED load circuit 406, the various feedback control algorithms used by bidirectional power converter 310, and the operational mode of bidirectional power converter 310. Controller 412 may also produce the switching signals for bidirectional power converter 310. In some embodiments, controller 412 is connected to bus 414, via serial interface 416 which may be implemented, for example, using an SPI interface, and I2C interface, MIPI/RFFE or other serial interface known in the art. In alternative embodiments of the present invention, serial interface 416 may also be implemented using a parallel interface.

During operation, controller 412 may receive a request to change the light intensity of LEDs 410 from bus 414. In response to the request, controller 412 may determine a new switch configuration for LED load circuit 406 the corresponding initial and final voltages that correspond to the change in switch configuration. For example, if the number of LED's is to change from five LEDs connected in series to four LEDs connected in series, controller 412 controls bidirectional power converter to transition from regulating its output current to regulating its output voltage in a manner that smoothly transitions from an output voltage corresponding to the forward voltage of five LEDs to the forward voltage of four LEDs. This smooth transition may have linear voltage profile that effectives ramps the voltage from the initial voltage to the final voltage. In some embodiments, this transition period may be on the order about 100 µs; however, other transition times may be used to ramp the voltage from the initial voltage to the final voltage depending on the particular system and its specifications. Alternatively other voltage transition profiles may be used including, but not limited to exponential and piecewise linear profiles.

In some embodiments, controller 412 operates bidirectional power converter 310 in the voltage control mode prior to changing the switching configuration only when the target voltage is less than the initial voltage, and allows bidirectional power converter 310 to remain in the current control mode when the target voltage exceeds the initial voltage. In other words, the voltage control loop is activated when there will be an expected decrease in output voltage. Such a control scheme may be used, for example, in instances where increasing the increasing voltage across capacitor Cout does not cause a current spike and/or an loss of energy.

Once the output voltage Vout has transitioned from the initial voltage to the final voltage, controller 412 provides a command or control signals to LED load circuit 406 to change the switch configuration of switches 409. After the switch configuration is changed, bidirectional power is changed from voltage control mode back to the current control mode. In embodiments in which a PWM signal is applied to switches 409 via multi-floating switch driver 408, controller 412 changes the mode of bidirectional power converter 310 from the current control mode to the voltage control mode before each change of switch configuration of switches 409 and then back to the current mode after the switch configuration has been changed.

Figure 5:
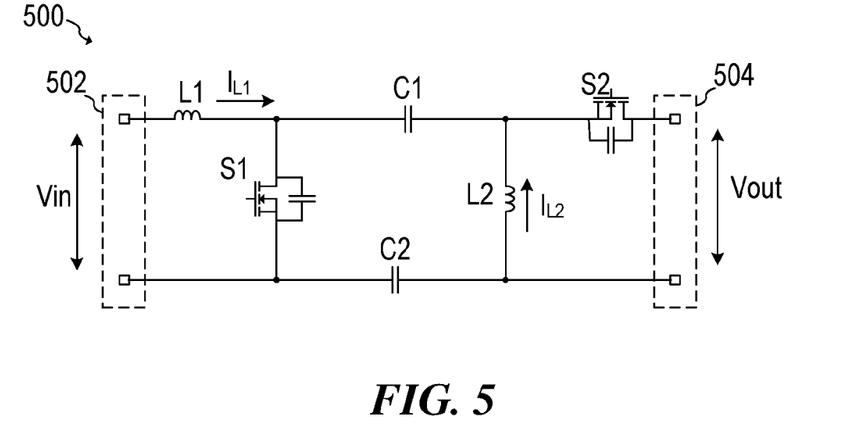
FIG. 5 illustrates a diagram of a SEPIC converter that may be used to implement embodiment energy recovery circuits.

FIG. 5 illustrates a SEPIC converter 500 that may be used to implement recovery circuit 404 shown in FIG. 4. As shown, SEPIC converter 500 includes two switches S1 and S2, two inductors L1 and L2 and capacitors C1 and C2 coupled between a supply input port 502 and a supply output port 504. When SEPIC converter 500 is implemented as energy recovery circuit, supply input port 502 is connected to the output of power converter 402 and supply output port 504 is connected to the input of power converter 402 shown in FIG. 4. SEPIC converter 500 can be viewed as a boost converter that is cascaded with a buck-boost converter. During operation, switch S1 is turned-on and inductors L1 and L2 are magnetized through switch S1 while switch S2 is turned off. Next, switch S1 is turned-off and switch S2, which functions as a synchronous rectifier, is turned on. Currents $I_{L1}$ and $I_{L2}$ through inductors L1 and L2 are redirected to the output port via switch S2.

In some embodiments, switch S2 may be replaced by a diode. In alternative embodiments where full DC isolation is not necessary, C2 can be omitted and replaced with a direct connection. It should be appreciated that SEPIC converter 500 is just one example of a power conversion circuit that may be used to implement an embodiment energy recovery circuit.

Figure 6:
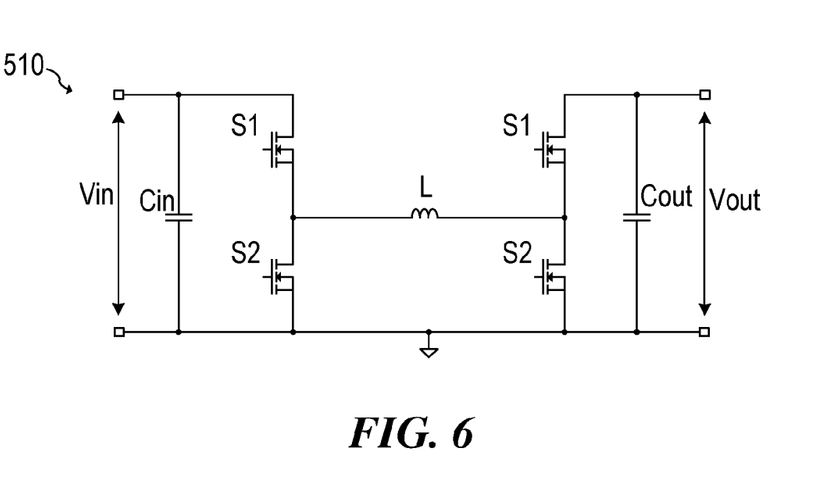
FIG. 6 illustrates an H-bridge converter that may be used to implement embodiment bidirectional power supply circuits.

FIG. 6 illustrates a bidirectional buck-boost converter 510 implemented using an H-bridge that performs both the forward converter and energy recovery functions of bidirectional power converter 310 shown in FIG. 4. As shown bidirectional buck-boost converter 510 includes inductor L coupled to an H-bridge that is made up of switches S1, S2, S3 and S4. During forward operation, switches S1 and S4 are closed and switches S2 and S3 are opened such that inductor L is magnetized. Next, switches S1 and S4 are closed and switches S2 and S3 are opened to allow the inductor L to demagnetize and provide current to output capacitor Cout. On the other hand, during reverse operation, switches S2 and S3 are closed and switches S1 and S4 are opened such that inductor L is magnetized with energy stored in output capacitor Cout. Next, switches S2 and S3 are opened and switches S1 and S4 are closed to allow the inductor L to demagnetize and provide current to input capacitor Cin or another energy storage circuit coupled to input capacitor Cin. It should be appreciated that H-bridge based bidirectional buck-boost converter 510 shown in FIG. 6 is just one example of a power conversion circuit that may be used to implement an bidirectional power converter.

In embodiments of the present invention, switches S1 and S2 of FIG. 5 and switches S1, S2, S3 and S4 of FIG. 5 may be implemented using transistors including, but not limited to metal oxide semiconductor field effect transistors (MOSFETs), power MOSFETs, junction field effect transistor (JFETs) high electron mobility transistor (HEMT) such as gallium nitride (GaN) HEMTs and insulated gate bipolar transistors (IGBTs). The selection of which transistor to use may be made according to the specifications and voltage levels of the particular power converter being designed.

Figure 7:
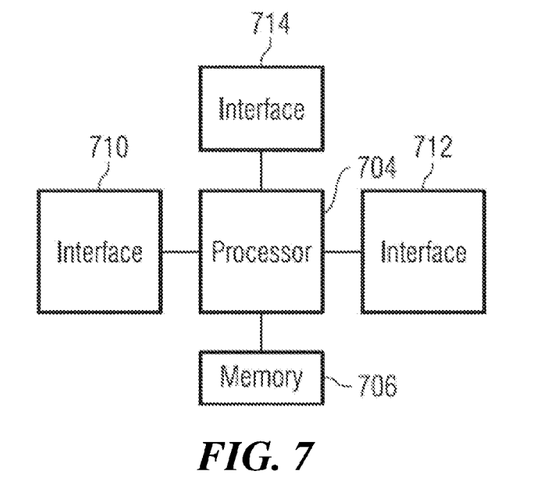
FIG. 7 illustrates a diagram of an embodiment processing system.

FIG. 7 illustrates a block diagram of a processing system 700 that may be used for implementing the devices and methods disclosed herein. The processing system 700 may include a processor 704, a memory 706, and a plurality of interfaces 710-714, which may (or may not) be arranged as shown in FIG. 7. The processor 704 may be any component capable of performing computations and/or other processing related tasks, and the memory 706 may be any component capable of storing programming and/or instructions for the processor 704. The interfaces 710-714 may be any component or collection of components that allows the processing system 700 to communicate with other systems and/or devices. The interfaces 710-714 may include serial interfaces (e.g., a Serial Peripheral Interface (SPI), Universal Serial Bus (USB), etc.), parallel interfaces, or combinations thereof.

Figure 8:
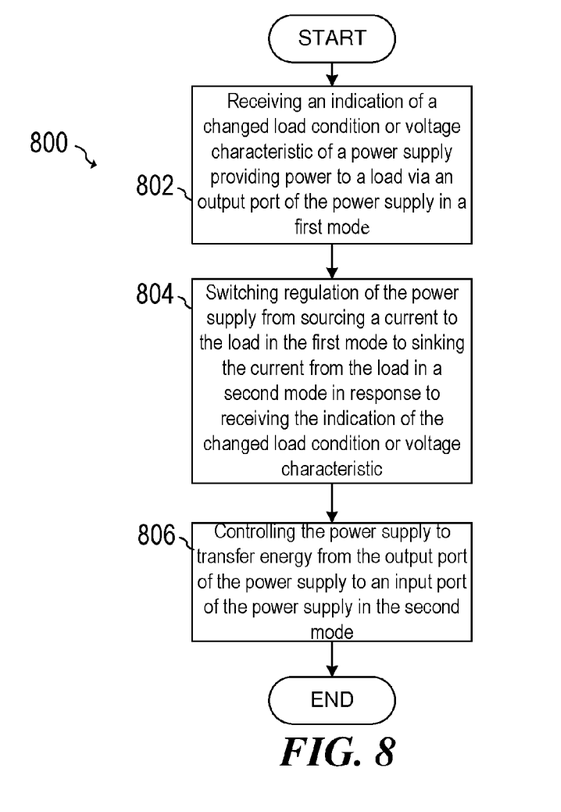
FIG. 8 illustrates a flowchart of an embodiment method.

Aspects of this disclosure provide methods for adapting power supplies to changing load conditions. FIG. 8 illustrates a method 800 for adapting a power supply to a changing load condition and for recovering, as might be performed by a controller. As shown, the method 800 begins at step 802, where the controller receives an indication of a changed load condition or voltage characteristic of a power supply providing power to a load via an output port of the power supply in a first mode. This may occur, for example, as a result of determining that a load condition of the power supply will change at some point in the future. Thereafter, the method 800 proceeds to step 804, where the controller switches regulation of the power supply from sourcing current to the load to sinking current from the load in response to receiving the indication of the changed load condition or voltage characteristic. In some embodiments, sourcing current to the load includes using a current control loop, and sinking current from the load includes using a voltage control loop. Alternatively, a current control loop may be used for both sourcing and sinking current to and from the load. In such an embodiment, the output voltage of the power supply is monitored such that the power supply sinks current from the load until the output voltage reaches a threshold and current is once again sourced to the load. In step 806, the power supply is controlled to transfer energy from the output port of the power supply to an input port of the power supply while the system is in the second mode.

Embodiments of the present invention are summarized here. Other embodiments can also be understood form the entirety of the specification and the claims filed herein. One general aspect includes a method including receiving an indication of a changed load condition or voltage characteristic of a power supply providing power to a load via an output port of the power supply in a first mode, and switching regulation of the power supply from sourcing a current to the load in the first mode to sinking the current from the load in a second mode in response to receiving the indication of the changed load condition or voltage characteristic. Sinking the current from the load in the second mode includes controlling the power supply to transfer energy from the output port of the power supply to an input port of the power supply.

Implementations may include one or more of the following features. The method where the load includes a chain of series-connected elements having a first number of circuit elements during a first period; and the indication of the changed load condition or voltage characteristic is received prior to a length of the chain of series-connected circuit elements being changed from the first number of circuit elements to a second number of circuit elements at a beginning of a second period. The chain of series-connected circuit elements may include a chain of light emitting diodes (LEDs) that is shortened from a first number of LEDs to a second number of LEDs at the beginning of the second period. In some embodiments, the method further includes switching regulation of the power supply back to the sourcing the current to the load in the first mode after the length of the chain of series-connected circuit elements has been changed from the first number of circuit elements to the second number of circuit elements.

In some embodiments, sinking the current from the load in the second mode includes changing an output of the power supply from an initial voltage to a target voltage. The target voltage may be less than the initial voltage and the method may further include discharging a capacitor coupled to the output port of the power supply when changing the output of the power supply from the initial voltage to the target voltage.

The power supply may include a bi-directional power supply, such that sourcing the current to the load in the first mode includes operating the bi-directional power supply in a first direction and sinking the current from the load in the second mode includes operating the bi-directional power supply in a second direction opposite the first direction. In some embodiments, the bi-directional power supply includes a first power converter coupled in parallel with a second power converter, operating the bi-directional power supply in the first direction includes operating a first power converter in the first direction, and operating the bi-directional power supply in the second direction includes operating the second power converter in the second direction. In an embodiment, the second power converter includes a single-ended primary inductor converter (SEPIC).

In an embodiment, sourcing the current to the load in the first mode includes using a current control loop to regulate the current in a first direction; and the sinking the current from the load includes monitoring a voltage of the output port of the power supply, comparing the monitored voltage with a threshold, and using a current control loop to regulate the current in a second direction opposite the first direction until the monitored voltage reaches the threshold. Sourcing the current to the load in the first mode may include using a current control loop to regulate the current in a first direction, and sinking the current from the load may include using a voltage control loop to control a voltage of the output port of the power supply.

Another general aspect includes an apparatus including a port configured to receive an indication of a changed load condition or voltage characteristic of a power supply providing power to a load via an output port of the power supply in a first mode, and a controller configured to switch regulation of the power supply from sourcing a current to the load in the first mode to sinking the current from the load in a second mode in response to receiving the indication of the changed load condition or voltage characteristic. Sinking the current from the load in the second mode includes controlling the power supply to transfer power from the output port of the power supply to an input port of the power supply.

Implementations may include one or more of the following features. The apparatus where the load includes a chain of series-connected elements having a first number of circuit elements during a first period, and the indication of the changed load condition or voltage characteristic is received prior to a length of the chain of series-connected circuit elements being changed from the first number of circuit elements to a second number of circuit elements at a beginning of a second period. In some embodiments, the chain of series-connected circuit elements includes a chain of light emitting diodes (LEDs) that is shortened from a first number of LEDs to a second number of LEDs at the beginning of the second period. The controller may be further configured to switch regulation of the power supply back to the sourcing the current to the load in the first mode after the length of the chain of series-connected circuit elements has been changed from the first number of circuit elements to the second number of circuit elements.

In some embodiments, sinking the current from the load is configured to charge an output of the power supply from an initial voltage to a target voltage in the second mode. The power supply may include a bi-directional power supply, sourcing the current to the load in the first mode may include operating the bi-directional power supply in a first direction, and sinking the current from the load in the second mode may include operating the bi-directional power supply in a second direction opposite the first direction. In a further embodiment, the bi-directional power supply includes a first power converter coupled in parallel with a second power converter; operating the bi-directional power supply in the first direction includes operating a first power converter in the first direction; and operating the bi-directional power supply in the second direction includes operating the second power converter in the second direction. The second power converter may include a single-ended primary inductor converter (SEPIC).

In an embodiment, the controller includes a voltage monitor circuit coupled to the output port of the power supply. The voltage monitor circuit is configured to monitor a voltage at the output port of the power supply, and compare the monitored voltage with a threshold. The controller also includes a current controller configured to regulate the current to the load in the first mode and configured to regulate the sinking of the current from the load in the second mode, where the controller is configured to transition from the second mode to the first mode when the monitored voltage reaches the threshold. In some embodiments, the controller includes a current controller configured to regulate the current to the load in the first mode, and a voltage controller configured to regulate a voltage of the output port of the power supply in the second mode.

Another general aspect includes a power supply system that includes: a bidirectional power converter having an output port configured to be coupled to series-connected light emitting diodes (LEDs) and a controller coupled to the bidirectional power converter. The controller a current control loop configured to regulate a current at the output port of the bidirectional power converter during a current control operation mode, and a voltage control loop configured to regulate a voltage at the output port of the bidirectional power converter during a voltage control operation mode. In various embodiment, the controller is configured to switch operation modes from the current control operation mode to the voltage control operation mode upon receiving an indication that a number of the series-connected LEDs is changing from a first number of series-connected LEDs to a second number of series-connected LEDs; cause the bidirectional power converter to transfer power in a first direction from an input port of the bidirectional power converter to an output port of the bidirectional power converter during the current control operation mode; and cause the bidirectional power converter to transfer power in a second direction from the output port of the bidirectional power converter to the input port of the bidirectional power converter during the voltage control operation mode.

Implementations may include one or more of the following features. The power supply system where the first number of series-connected LEDs is greater than the second number of series-connected LEDs. In some embodiments, the system further includes the series-connected LEDs and a capacitor coupled in parallel with the series-connected LEDs.

In some embodiments, the bidirectional power converter comprises an H-bridge converter. In other embodiments, the bidirectional power converter includes a first power converter configured to transfer power from the input port of the bidirectional power converter to the output port of the bidirectional power converter; and a second power converter coupled in parallel with the first power converter, the second power converter configured to transfer power from the output port of the bidirectional power converter the input port of the bidirectional power converter. The second power converter may be implemented, for example, using a single-ended primary inductor converter (SEPIC).

Advantages of embodiments include the ability for an LED power supply to dynamically change a number of series-connected LED segments in a manner that prevents appreciable current spikes. A further advantage includes the ability to recover energy from the output capacitor of the power supply when the power supply transitions between output voltages.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
receiving an indication of a changed load condition or voltage characteristic of a power supply providing power to a load via an output port of the power supply in a first mode; and
switching regulation of the power supply from sourcing a current to the load in the first mode to sinking the current from the load in a second mode in response to receiving the indication of the changed load condition or voltage characteristic, wherein sinking the current from the load in the second mode comprises controlling the power supply to transfer energy from the output port of the power supply to an input port of the power supply.

2. The method of claim 1, wherein
the load comprises a chain of series-connected circuit elements having a first number of circuit elements during a first period; and
the indication of the changed load condition or voltage characteristic is received prior to a length of the chain of series-connected circuit elements being changed from the first number of circuit elements to a second number of circuit elements at a beginning of a second period.

3. The method of claim 2, wherein the chain of series-connected circuit elements comprises a chain of light emitting diodes (LEDs) that is shortened from a first number of LEDs to a second number of LEDs at the beginning of the second period.

4. The method of claim 2, further comprising:
switching regulation of the power supply back to the sourcing the current to the load in the first mode after the length of the chain of series-connected circuit elements has been changed from the first number of circuit elements to the second number of circuit elements.

5. The method of claim 1, wherein sinking the current from the load in the second mode comprises changing an output of the power supply from an initial voltage to a target voltage.

6. The method of claim 5, wherein:
the target voltage is less than the initial voltage; and
the method further comprises discharging a capacitor coupled to the output port of the power supply when changing the output of the power supply from the initial voltage to the target voltage.

7. The method of claim 1, wherein:
the power supply comprises a bi-directional power supply;
sourcing the current to the load in the first mode comprises operating the bi-directional power supply in a first direction; and
sinking the current from the load in the second mode comprises operating the bi-directional power supply in a second direction opposite the first direction.

8. The method of claim 7, wherein:
the bi-directional power supply comprises a first power converter coupled in parallel with a second power converter;
operating the bi-directional power supply in the first direction comprises operating a first power converter in the first direction; and
operating the bi-directional power supply in the second direction comprises operating the second power converter in the second direction.

9. The method of claim 8, wherein the second power converter comprises a single-ended primary inductor converter (SEPIC).

10. The method of claim 1, wherein:
the sourcing the current to the load in the first mode comprises using a current control loop to regulate the current in a first direction; and
the sinking the current from the load comprises
monitoring a voltage of the output port of the power supply,
comparing the monitored voltage with a threshold, and
using a current control loop to regulate the current in a second direction opposite the first direction until the monitored voltage reaches the threshold.

11. The method of claim 1, wherein
the sourcing the current to the load in the first mode comprises using a current control loop to regulate the current in a first direction; and
the sinking the current from the load comprises using a voltage control loop to control a voltage of the output port of the power supply.

12. An apparatus comprising:
a port configured to receive an indication of a changed load condition or voltage characteristic of a power supply providing power to a load via an output port of the power supply in a first mode; and
a controller configured to switch regulation of the power supply from sourcing a current to the load in the first mode to sinking the current from the load in a second mode in response to receiving the indication of the changed load condition or voltage characteristic, wherein sinking the current from the load in the second mode comprises controlling the power supply to transfer power from the output port of the power supply to an input port of the power supply.

13. The apparatus of claim 12, wherein
the load comprises a chain of series-connected circuit elements having a first number of circuit elements during a first period; and
the indication of the changed load condition or voltage characteristic is received prior to a length of the chain of series-connected circuit elements being changed from the first number of circuit elements to a second number of circuit elements at a beginning of a second period.

14. The apparatus of claim 13, wherein the chain of series-connected circuit elements comprises a chain of light emitting diodes (LEDs) that is shortened from a first number of LEDs to a second number of LEDs at the beginning of the second period.

15. The apparatus of claim 13, wherein the controller is further configured to switch regulation of the power supply back to the sourcing the current to the load in the first mode after the length of the chain of series-connected circuit elements has been changed from the first number of circuit elements to the second number of circuit elements.

16. The apparatus of claim 13, wherein the sinking the current from the load is configured to charge an output of the power supply from an initial voltage to a target voltage in the second mode.

17. The apparatus of claim 12, wherein:
the power supply comprises a bi-directional power supply;
sourcing the current to the load in the first mode comprises operating the bi-directional power supply in a first direction; and
sinking the current from the load in the second mode comprises operating the bi-directional power supply in a second direction opposite the first direction.

18. The apparatus of claim 17, wherein:
the bi-directional power supply comprises a first power converter coupled in parallel with a second power converter;
operating the bi-directional power supply in the first direction comprises operating a first power converter in the first direction; and
operating the bi-directional power supply in the second direction comprises operating the second power converter in the second direction.

19. The apparatus of claim 18, wherein the second power converter comprises a single-ended primary inductor converter (SEPIC).

20. The apparatus of claim 12, wherein the controller comprises:
a voltage monitor circuit coupled to the output port of the power supply, the voltage monitor circuit configured to monitor a voltage at the output port of the power supply, and compare the monitored voltage with a threshold; and
a current controller configured to regulate the current to the load in the first mode and configured to regulate the sinking of the current from the load in the second mode, wherein the controller is configured to transition from the second mode to the first mode when the monitored voltage reaches the threshold.

21. The apparatus of claim 12, wherein the controller comprises:
a current controller configured to regulate the current to the load in the first mode; and
a voltage controller configured to regulate a voltage of the output port of the power supply in the second mode.

22. A power supply system comprising:
a bidirectional power converter having an output port configured to be coupled to series-connected light emitting diodes (LEDs); and
a controller coupled to the bidirectional power converter, the controller comprising:
a current control loop configured to regulate a current at the output port of the bidirectional power converter during a current control operation mode, and
a voltage control loop configured to regulate a voltage at the output port of the bidirectional power converter during a voltage control operation mode;
wherein the controller is configured to
switch operation modes from the current control operation mode to the voltage control operation mode upon receiving an indication that a number of the series-connected LEDs is changing from a first number of series-connected LEDs to a second number of series-connected LEDs,
cause the bidirectional power converter to transfer power in a first direction from an input port of the bidirectional power converter to an output port of the bidirectional power converter during the current control operation mode, and
cause the bidirectional power converter to transfer power in a second direction from the output port of the bidirectional power converter to the input port of the bidirectional power converter during the voltage control operation mode.

23. The power supply system of claim 22, wherein the first number of series-connected LEDs is greater than the second number of series-connected LEDs.

24. The power supply system of claim 22, further comprising:
the series-connected LEDs; and
a capacitor coupled in parallel with the series-connected LEDs.

25. The power supply system of claim 22, wherein the bidirectional power converter comprises an H-bridge converter.

26. The power supply system of claim 22, wherein the bidirectional power converter comprises:
a first power converter configured to transfer power from the input port of the bidirectional power converter to the output port of the bidirectional power converter; and
a second power converter coupled in parallel with the first power converter, the second power converter configured to transfer power from the output port of the bidirectional power converter the input port of the bidirectional power converter.

27. The power supply system of claim 26, wherein the second power converter comprises a single-ended primary inductor converter (SEPIC).

* * * * *